Aug. 8, 1967  T. F. IRVINE  3,334,383
MOLDING APPARATUS
Filed Nov. 3, 1965
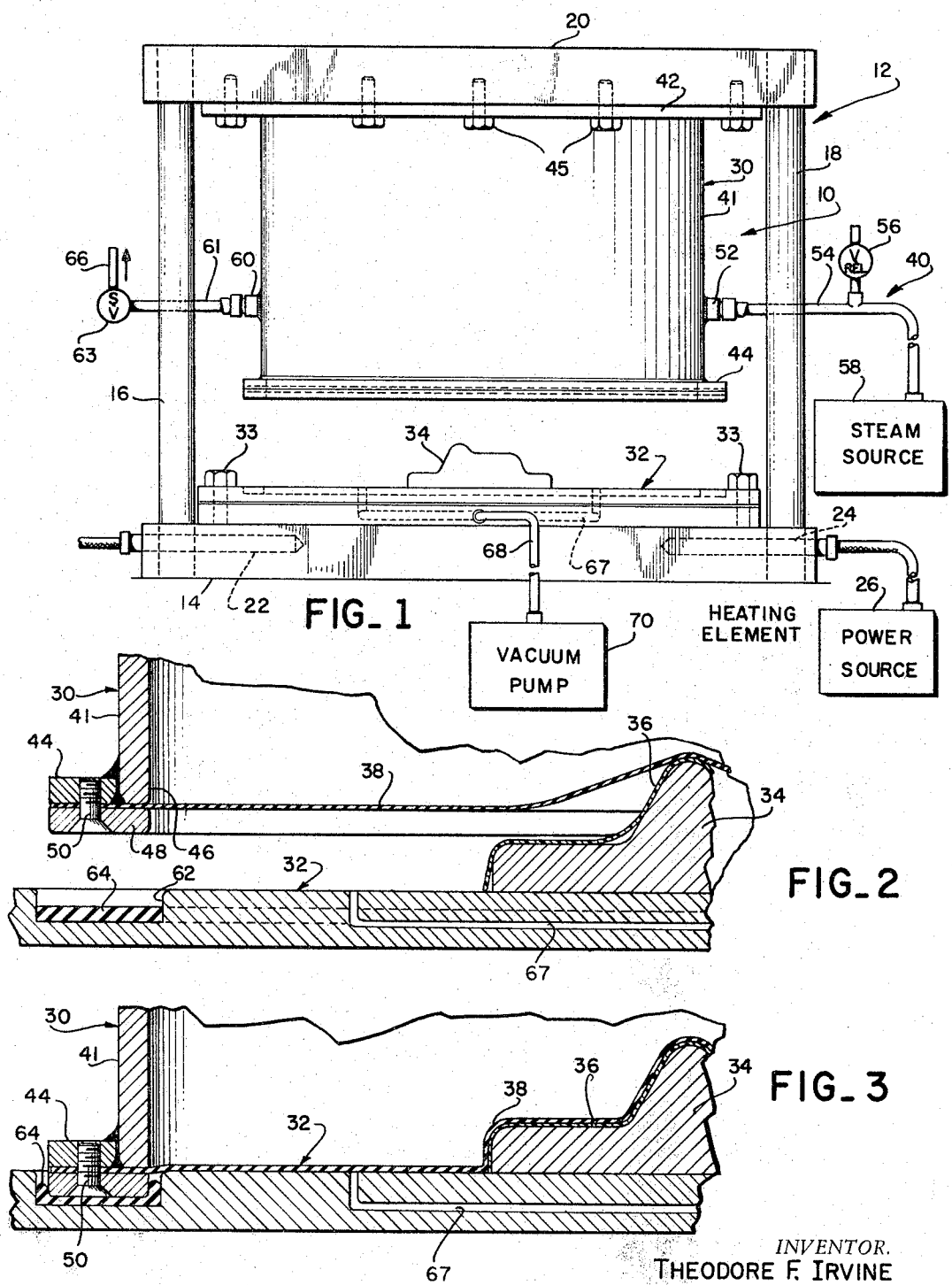
INVENTOR.
THEODORE F. IRVINE
BY George Sullivan
Agent

United States Patent Office 3,334,383
Patented Aug. 8, 1967

3,334,383
MOLDING APPARATUS
Theodore F. Irvine, North Hollywood, Calif., assignor to Lockheed Aircraft Corporation, Burbank, Calif.
Filed Nov. 3, 1965, Ser. No. 506,205
5 Claims. (Cl. 18—19)

ABSTRACT OF THE DISCLOSURE

A molding apparatus utilizing heat, pressure, and vacuum for forming parts. An upper platen portion of the device has a flexible diaphragm cover over its opening and moves as a unit into engagement with a stationary bottom platen for pressure sealing purposes. In operation, heat and pressure are applied to the side of the diaphragm opposite the mold while a vacuum is concurrently produced on the opposite side. As the heat and pressure form the plastic part into the configuration of the mold, the vacuum assists by forcing the diaphragm into intimate contact with the plastic part.

---

This invention relates to a molding apparatus operating with both heat and pressure and in addition uses vacuum to form and mold parts, and more particularly to molding apparatus in which the sealing and safety features are combined.

Heretofore reinforced plastic parts were traditionally formed by tailoring a series of pre-impregnated fabric over a mold until a desired thickness is obtained. A flexible film is fitted over the fabric and mold and a vacuum is applied under the film to force the pre-impregnated cloth against the mold. The entire unit is then placed within a heating device such as an autoclave and heat is applied in order to cure the plastic within the pre-impregnated cloth. The chief difficulty of obtaining satisfactory parts in this prior art process lies chiefly in the difficulty in properly applying the flexible film on the plastic parts and obtaining uniform pressure applied through the medium of the vacuum.

While the prior art process used for forming reinforced plastic parts using the conventional "vacuum bag" process has been used for an extended period, a common complaint of the parts formed by such a process are related to the quality of the parts. Most generally for shapes which include compound curves and deep channels, the finished parts have bulges and bubbles formed under the surface of the various layers of pre-impregnated fabric. This invention is directed to apparatus which eliminates poor quality parts by applying both positive pressure and vacuum on opposite sides of a reinforced plastic part.

There exists some molding equipment in which a diaphragm is forced over an uncured reinforced plastic part draped over a mold and steam or other pressurizing medium forces the diaphragm and part against the mold from all sides. A vacuum is pulled between the plastic part and the mold to force the part to conform to the shape of the mold. Accordingly, the steam will thereupon perform both functions of applying pressure to the diaphragm and heat the plastic in the reinforced part until the plastic is cured. There are some difficulties in the prior art molding devices which basically arise in sealing the diaphragm against a plate which supports the mold and in addition to safely operating this apparatus. The prior art molding devices are frequently used in presses operating with pressures up to 30 tons which does cause some inherent sealing problems due to the high pressures involved. An equally difficult problem exists when using high pressure steam in an enclosed chamber since the problems of both leakage of the steam and expansion of the chamber retaining the steam can create a hazardous condition for operators of this equipment.

In accordance with the present invention, a molding apparatus has been developed in which the structure is so arranged as to perform both the functions of sealing a pressure chamber against a supporting plate in addition to preventing the pressure chamber from expanding and causing a hazardous condition during its operation. Basically the molding device in accordance with the present invention is mounted in a conventional press having a movable top platen and a stationary bottom platen. A rigid, closed pressure chamber is secured to the movable top platen and this chamber has an opening directed toward the stationary bottom platen. A means for pressurizing and heating the mold device is coupled to the rigid chamber. A flexible diaphragm is secured to the rigid chamber and covers the chamber opening. A rigid plate is secured to the bottom platen and is aligned with the chamber opening. A means is located on the chamber and the rigid plate for preventing expansion of the chamber and for preventing pressure leakage from the chamber.

Other features and advantages of the invention will become apparent upon review of the specification and appended drawings in which:

FIGURE 1 is a side elevation of a molding device constructed in accordance with the present invention and shown in a position in which a mold is exposed preparatory to the application of a reinforced plastic layer to be applied on the mold;

FIGURE 2 is a partial cross-sectional view of the pressure chamber and mold as shown in a position with the chamber approaching a closed position; and FIGURE 3 is a partial cross-sectional view similar to FIGURE 2 with the pressure chamber shown in a closed position and pressure being applied to a diaphragm forcing a reinforced plastic part against a mold.

Referring now to all the figures, a molding device 10 constructed in accordance with the present invention is used in combination with a conventional press 12. This press includes a stationary bottom platen 14 which has mounted thereon two supporting columns 16 and 18 extending upwardly and located parallel to one another. A movable top platen 20 is supported by the columns 16 and 18 and is reciprocated vertically by conventional press apparatus (not shown) in a manner well known in the press art. The particular details of the press are not important to the present invention since many conventional presses can be used with the molding apparatus constructed in accordance with the present invention. In an alternate embodiment of the invention, the stationary bottom platen 14 is heated by a plurality of resistance heating elements 22 and 24 which are both coupled to a power source 26. This arrangement then permits both the bottom platen 14 and the molding apparatus to be heated by the same heating source. The heated bottom platen is not necessary to perform the invention, however, it is useful in some instances where the shape of the mold is very complex.

The molding apparatus 10 comprises a pressure chamber 30 secured to the movable top platen 20 and operating against a rigid bottom plate 32 secured to the stationary bottom platen 14. A conventional pattern or mold 34 is mounted upon the rigid plate 32 and serves to give a definite shape of a reinforced plastic part 36 best illustrated in FIGURES 2 and 3. A flexible diaphragm 38 is secured to the pressure chamber 30 and operating in conjunction with a heating and pressurizing device such as a steam system 40 is used to apply pressure to the plastic part 36 and concurrently heating this part as it is forced into its final position against the mold 34 as best shown in FIGURES 2 and 3.

The pressure chamber 30 is formed from a length of cylindrical tubing 41 having at one end a flat plate 42 secured thereto by a welding or similar fastening devices. Plate 42 extends beyond the extremities of the tubing 41 to form a flange through which extend a plurality of bolts 45 that are engaged into the movable platen 20. Thus the pressure chamber 30 moves with the movable upper platen 20 as a unit. At the opposite extremity of the tubing 41 is welded a cylindrical ring 44 serving to increase the size of the tubing 41. The tubing 41 has an opening 46 which is covered by the flexible diaphragm 38 that is held in place by a cylindrical ring 48 and a plurality of fasteners 50 extending therethrough and engaging with the flange 44. The diaphragm is preferably formed from a sheet of silicone butyrate rubber having an elongation factor of 400% before tearing. The particular cross section of the tubing 41 and the shape of the flange 44 and ring 48 are not limited to circular cross sections but extend to any polygonal or curvilinear form which is best adapted for particular shape or size of the mold used in conjunction with the molding apparatus constructed in accordance with the present invention.

The pressure chamber 30 includes an inlet coupling 52 secured to the tubing 41 and this coupling is mounted with a conventional steam line 54 having conventional appropriate controls (not shown) including a conventional relief valve 56 and terminating in a steam source 58 thereby forming the steam system 40. An outlet coupling 60 is mounted upon the tubing 41 and is connected to a steam outlet line 61 having a shut-off valve 63 leading to an outlet system in the form of a steam line 66 that leads to atmosphere.

The rigid plate 32 is secured to the stationary bottom platen by conventional fasteners 33. A continuous circular groove 62 is formed in the plate 32 and is positioned below and aligned with the ring 48 extending as protrusion from the tubing 41. The continuous groove 62 has a size which is large enough to accept the entrance of the ring 48 therein. A gasket 64 is disposed in the interior of the groove 62 and serves to seal the pressure chamber 30 when the ring 48 is forced within the gasket. The gasket is preferably formed from neoprene rubber and reinforced with nylon fibers.

The rigid plate 32 has a plurality of manifolds 67 formed therein and these manifolds are connected to a vacuum line 68 that is coupled to a conventional vacuum pump 70.

The pressure chamber has a first position which is illustrated in FIGURE 3 wherein the tubing 41 is disposed against the rigid plate 32 and the ring 48 is completely submerged in the gasket 64 and disposed entirely within the groove 62. With the pressure chamber in this position, the vacuum which is directed through the manifold 67 cannot leak past the continuous groove 62 and thereby the diaphragm 38 is forced against the mold 34 and against the rigid plate 32. The particular construction of the ring 48 and the groove 62 is an important feature of the present invention since this construction besides sealing the pressure chamber 30 against the rigid plate 32, it also prevents expansion of the pressure chamber 30 outwardly when it is under the influence of the steam entering the tubing 41 through the steam line 54. Outer movement caused by expansion will be prevented by the cooperation of the ring 48 within the groove 62 and thereby this arrangement serves as a safety feature of the molding device when it is in its first position illustrated in FIGURE 3.

The second position of the molding apparatus constructed in accordance with the present invention is illustrated in FIGURE 1 wherein the pressure chamber 30 is in a position spaced from the rigid plate 32.

The operation of the molding apparatus in accordance with the present invention will now be described. A mold 34 is placed upon the rigid panel 32 and centrally located below the pressure chamber 30. A plastic part 36 being formed from conventional pre-impregnated fabric is draped over the mold and formed from a plurality of pretailored, pre-impregnated fabric. This fabric can be formed for example from glass fiber cloth impregnated with polyester or epoxy resins; this type of fabric is well known in the plastic industry. Normally, the plastic which is used to impregnate the fabric is only partially cured and heat is required to transform the plastic into a cured state. As illustrated in FIGURE 2, the plastic part is draped over the mold 34 and is tailored to permit movement of the fabric to conform to the shape of the mold. The pressure chamber 30 is forced downwardly over the plastic part 36 and the mold 34 until the ring 48 compresses the gasket 64 and is totally submerged within the groove 62 as shown in FIGURE 3. Vacuum pump 70 subjects the one side of the flexible diaphragm 38 to a vacuum tending to force this diaphragm into an intimate contact with plastic part 36. Steam from the source 58 is conducted through the steam line 54 and fills the pressure chamber 30 up to a pressure of approximately 30–90 p.s.i. Thus the steam then provides both heat to cure the plastic part 36 and also provides the pressure to force the diaphragm 38 into intimate contact with the plastic part 36. During the entire operation, the pressure chamber 30 is held into the position illustrated in FIGURE 3 by a force applied through the upper platen 20 and this force should be 30 tons of pressure or more. The vacuum and the steam is applied to opposite sides of the diaphragm 38 for a period which is sufficient to cure the plastic part 36. This time should be between 8 and 16 minutes depending upon the particular type of plastic used in the part 36. After sufficient time has transpired to cure the plastic part, the steam pressure is released through valve 63 and the vacuum pump 70 is shut off and the movable upper platen is moved to a position as illustrated in FIGURE 1 whereupon the plastic part 36 may be removed from the mold 34 and the molding apparatus is cleaned and prepared for duplicating the same process repeatedly.

I claim:

1. A molding device being mounted in a conventional press having a movable top platen and a stationary bottom platen comprising:
   a rigid, closed, hollow chamber being secured to the movable top platen of the press and having an opening directed toward the stationary bottom platen, the chamber having a continuous projection extending toward the bottom platen;
   a means for pressurizing and heating the rigid chamber;
   a flexible diaphragm being secured to the rigid chamber and covering the chamber opening;
   a rigid plate secured to the bottom platen, the plate having a continuous groove formed therein and being aligned with the chamber opening and being formed in a manner to accept the entrance of the chamber projection into the groove and thereby serve to suppress expansion of the chamber when being pressurized;
   means being disposed in the plate groove for preventing leakage of pressure from the chamber when the chamber is lowered upon the bottom plate and the continuous projection extends into the plate groove.

2. A molding device being mounted in a conventional press having a movable top platen and a stationary bottom platen comprising:
   a rigid closed cylindrical chamber being secured to the movable top platen of the press and having a cylindrical opening directed toward the stationary bottom platen;
   a ring being coupled to the chamber adjacent to the chamber opening;
   a means for pressurizing and heating the rigid chamber;
   a flexible diaphragm being inserted between the cylinder and the ring;
   a rigid plate secured to the bottom platen, the plate having a continuous groove formed therein and of a shape which mates with the ring; and a resilient gasket being disposed in the plate groove, the chamber having a first position in which the ring compresses the gasket and prevents pressure leakage from the chamber and the ring extends into the plate groove and prevents expansion of the chamber when it is under pressure, and the chamber having a second position in which the chamber is spaced from the plate.

3. A mold device being mounted in a conventional press having a movable top platen and a stationary bottom platen comprising:

a rigid closed chamber being secured to the movable top platen of the press and having an opening directed toward the stationary bottom platen, the chamber having a continuous projection extending toward the bottom platen;

a steam system being coupled to closed chamber for pressurizing and heating the chamber;

a flexible diaphragm being secured to the rigid chamber and covering the chamber opening;

a rigid plate secured to the bottom platen, the rigid plate including a barrier that mates and surrounds the chamber when the chamber is in a first position in which it abuts the plate, the barrier prevents the expansion of the chamber when it is pressurized, the chamber having a second position when it is spaced from the plate;

a resilient gasket secured to the plate adjacent the plate barrier and the gasket continuously engaging the chamber when the chamber is pressurized, the plate having a series of openings therethrough; and a vacuum system being coupled to the plate openings in order to evacuate the area between the diaphragm and the plate when the chamber is in the first position.

4. A molding device being mounted in a conventional press having a movable top platen and a stationary bottom platen as defined in claim 1 wherein said chamber has a first position in which it abuts the said rigid plate and a second position in which it is spaced from said rigid plate.

5. A molding device being mounted in a conventional press having a movable top platen and a stationary bottom platen as defined in claim 4, including means being disposed in said rigid plate for ducting entrapped fluid between said diaphragm and said rigid plate when said chamber is in its second position.

References Cited

UNITED STATES PATENTS

| | | | |
|---|---|---|---|
| 1,209,308 | 12/1916 | Lanhoffer | 18—19 |
| 2,519,661 | 8/1950 | Johnson | 18—19 X |
| 2,690,593 | 10/1954 | Abercombie | 18—19 |
| 3,180,776 | 4/1965 | Hessel | 18—19 X |

WILLIAM J. STEPHENSON, *Primary Examiner.*